United States Patent [19]

Tixier et al.

[11] Patent Number: 5,684,270

[45] Date of Patent: Nov. 4, 1997

[54] JOINT WITH A BOSS FOR A LONG DISTANCE GAS-INSULATED THREE-PHASE CABLE

[75] Inventors: René Tixier, Lyons; Van Doan Pham, Meyzieu, both of France

[73] Assignee: GEC Alsthom T & D SA, Paris, France

[21] Appl. No.: 570,857

[22] Filed: Dec. 12, 1995

[30] Foreign Application Priority Data

Dec. 15, 1994 [FR] France ..................... 94 15131

[51] Int. Cl.$^6$ .................... H02G 15/20; H02G 15/24
[52] U.S. Cl. ................. 174/21 R; 174/22 R; 174/24; 174/28
[58] Field of Search .................... 174/11 R, 14 R, 174/15.1, 17 CT, 17 VA, 20, 21 R, 22 R, 24, 28

[56] References Cited

U.S. PATENT DOCUMENTS

| | | | |
|---|---|---|---|
| 2,540,909 | 2/1951 | Pouzet | 174/20 |
| 3,331,911 | 7/1967 | Whitehead | 174/22 R |
| 3,934,071 | 1/1976 | Tahiliani | 174/31 R X |
| 4,123,619 | 10/1978 | Bolin | 174/19 X |
| 4,234,006 | 11/1980 | Cookson | 137/15 X |

FOREIGN PATENT DOCUMENTS

| | | | |
|---|---|---|---|
| 2125198 | 9/1972 | France . | |
| 45-22786 | 3/1966 | Japan | 174/21 R |
| WO9100633 | 1/1991 | WIPO . | |

OTHER PUBLICATIONS

IBM Technical Disclosure Bulletin vol. 12, No. 3, Aug. 1969.

Primary Examiner—Kristine L. Kincaid
Assistant Examiner—Chau N. Nguyen
Attorney, Agent, or Firm—Sughrue, Mion, Zinn, Macpeak & Seas, PLLC

[57] ABSTRACT

A joint with a boss for fitting to an assembly compartment for assembling together two adjacent lengths of a long-distance gas-insulated three-phase cable, the joint including a boss containing the seats of an externally-controllable valve whose drive combinations make it possible to establish communication independently either between the inside volumes of adjacent lengths, or the outside of the cable with the inside volumes of both adjacent lengths, or the outside of the cable with the inside volumes of one only of the lengths.

8 Claims, 7 Drawing Sheets

JOINT WITH A BOSS FOR A LONG DISTANCE GAS-INSULATED THREE-PHASE CABLE

The present invention relates to a joint for interconnecting two lengths of a long-distance gas-insulated three-phase cable.

BACKGROUND OF THE INVENTION

French patent application No. 93 15355 describes a long-distance gas-insulated three-phase cable comprising a cylindrical steel case containing three phase conductors disposed parallel to the axis of the case. An aluminum case having the same length is disposed between the conductors and the steel case, very close to the steel case, and constitutes a magnetic screen serving to reduce heating of the steel case. It is specified that the cable is constituted by a plurality of factory-assembled compartments each comprising its own steel case element, aluminum case element, and three conductors supported on insulating arms; such a compartment has a length lying in the range 5 meters (m) to 12 m. The compartments are welded end to end, with a set of ten compartments, for example, forming a length of cable. The cable is filled with insulating gas, such as nitrogen under pressure. The document also specifies that two lengths are interconnected by end pieces fitted with special pieces enabling the conductors and the cases to expand, enabling two adjacent lengths to be disassembled, and providing individual sealing for the lengths. It is also mentioned that the end elements include valves for filling and venting the insulating gas.

OBJECTS AND SUMMARY OF THE INVENTION

The invention seeks to fit the assembly compartment between two lengths with a joint that serves not only as a support for insulating cones that hold the conductors and the assembly elements of the two adjacent lengths, but also to incorporate the valves for filling the length with insulating gas, for venting it of said gas, and also for evacuating the length prior to it being filled with insulating gas.

The invention provides a joint with a boss for fitting to an assembly compartment for assembling together two adjacent lengths of a long-distance gas-insulated three-phase cable, the joint including a boss containing the seats of an externally-controllable valve whose drive combinations make it possible to establish communication independently either between the inside volumes of said adjacent lengths, or the outside of the cable with the inside volumes of both adjacent lengths, or the outside of the cable with the inside volume of one only of the lengths.

In a preferred embodiment, said boss has a main bore opening to the outside and provided with a sealed cover fitted with a plug capable of being withdrawn or replaced by means of a first wrench.

The joint includes a passage putting the inside volumes of the two adjacent lengths into communication, said passage being capable of being closed by means of a first valve member bearing against a first seat constituted by a shoulder inside the boss, said valve member being fixed to a first rod opening out into said bore adjacent to the cover and provided with engagement means for engaging a second wrench operable from outside the cable.

Said first rod is moved by screwing inside an axial bore in a cylindrical part disposed axially in stationary manner inside the main bore.

Said cylindrical part is pierced by axial bores opening out firstly into said passage and secondly into the main bore adjacent to the cover, the ends of said axial bores adjacent the cover constituting a second seat closable by a second valve member fixed to a second rod terminating in said bore at a cover end provided with engagement means for engaging a third wrench operable from outside the cable.

The second rod is a coaxial tube that screws on said cylindrical part.

The plug can be replaced by a fourth wrench constituted by a tube provided at one end with means for engaging the end of said second rod and at its other end with means for connection to a vacuum pump, said tube being provided with plug-replacement means for being fixed in sealed manner instead of and in the place of the plug, and a valve placed between the means for connection to the vacuum pump and the plug replacement means.

The passage includes a dust filter on its boss side.

BRIEF DESCRIPTION OF THE DRAWINGS

The invention is explained in detail by the following description of a preferred embodiment given with reference to the accompanying drawings, in which.

MORE DETAILED DESCRIPTION

Figure 1A:
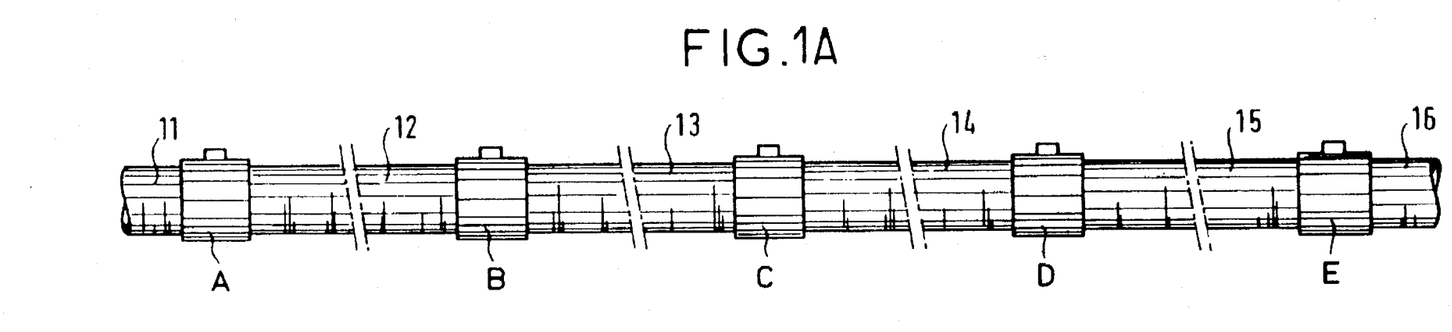
FIG. 1A shows a piece of long distance cable.

FIG. 1A shows a piece of long-distance gas-insulated cable comprising lengths 11, 12, 13, 14, 15, and 16 each of which is about 100 meters long, which lengths are interconnected by dismounting compartments A, B, C, D, and E; in the description below, it is assumed that it is the length 14 between the dismounting compartments C and D which is to be dismounted, e.g. for replacement purposes.

It should be observed that during manufacture in the factory, each length is provided with its own dismounting compartment. In the figure, the length 12 possesses compartment A, the length 13 possesses compartment B, and more generally each length possesses the compartment shown to the left in the figure. Electrical insulation is preferably provided by nitrogen, e.g. at an operating pressure of 12,000 hectopascals.

Figure 1B:
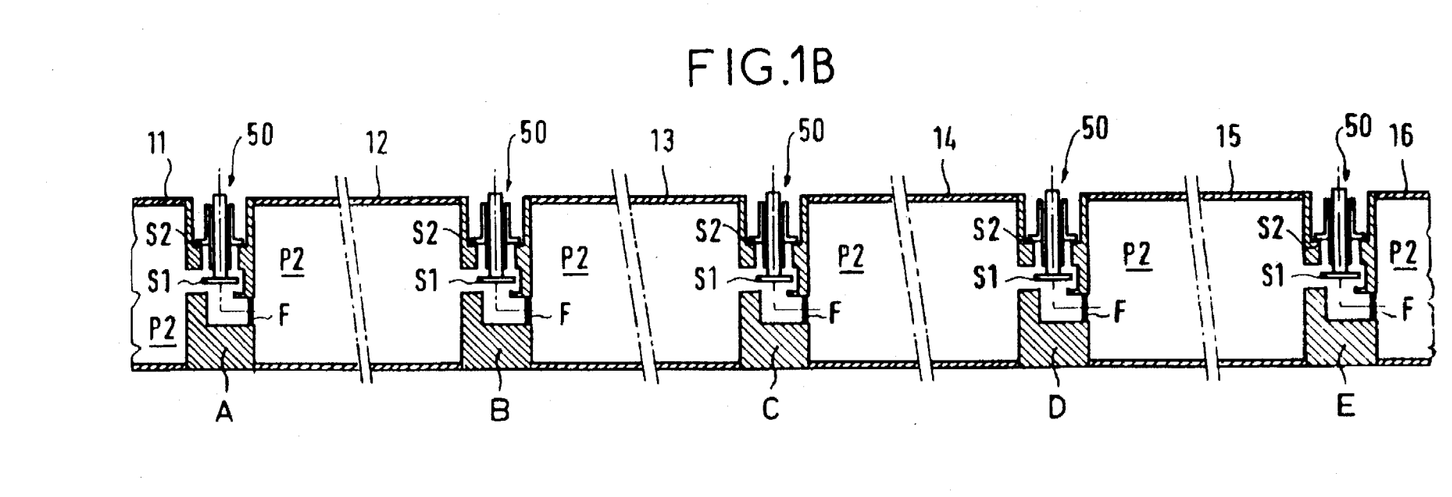
FIG. 1B is a view on a larger scale of FIG. 1A, showing how it is split up into disassembly compartments.

As shown in FIG. 1B, each compartment possesses a valve 50 having two closable seats S1 and S2. The seats can be opened and closed from outside by means of a socket wrench placed at the end of a pole. The seats S1 are open to allow the insulating gas to pass: in normal operation, as shown in FIG. 1B, all of the seats S1 are open so the insulating gas at a nitrogen pressure S2 of 12,000 hectopascals flows freely between lengths through filters F provided in each of the dismounting compartments. The seats S2 serve to put the inside of the length into communication with the atmosphere. In FIG. 1B, the seats S2 are therefore closed.

Figure 2:
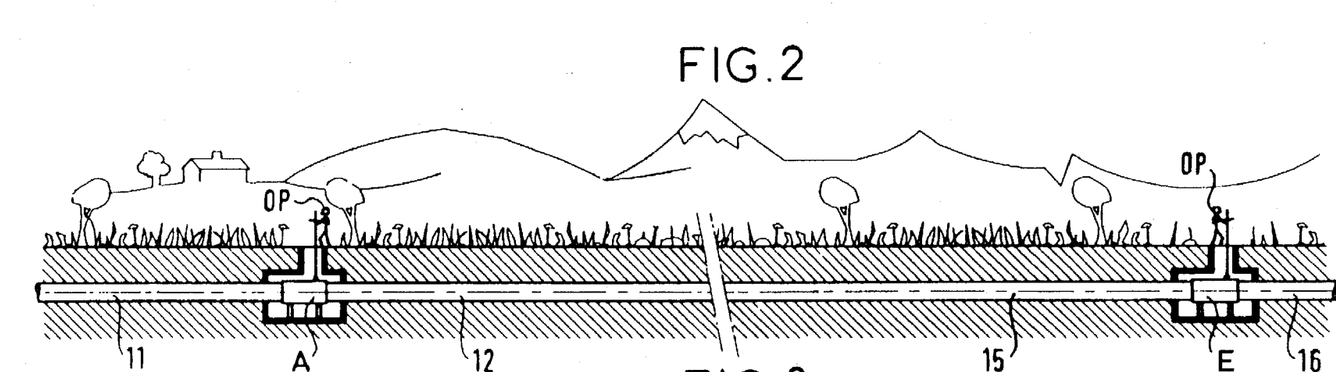
FIG. 2 shows a buried cable.

FIG. 2 shows the cable when buried: since the length 14 is to be dismounted, the operator OP acts on elements A and E to close their seats S1 and to enable the four lengths AB, BC, CD, and DE to be separated from the gas feed circuit prior to dismounting the length CD.

Figure 3:
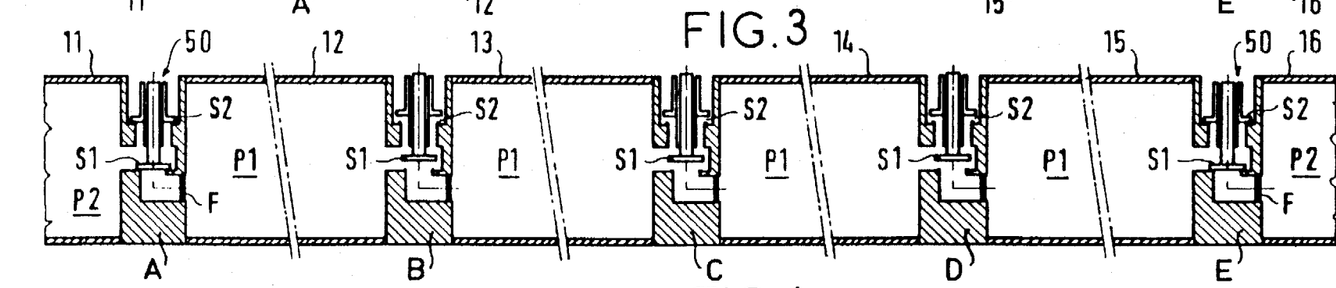
FIGS. 3 and 4 show how the valves are operated when dismounting a length.

FIG. 3 illustrates the above operation. It shows the seats S1 in A and E closed, and the seats S2 in B, C, and D open until a nitrogen pressure P1 is obtained in the lengths AB, BC, CD, and DE equal to 1,000 hectopascals, so as to avoid moist air penetrating into the lengths during dismounting of the length CD.

Figure 4:
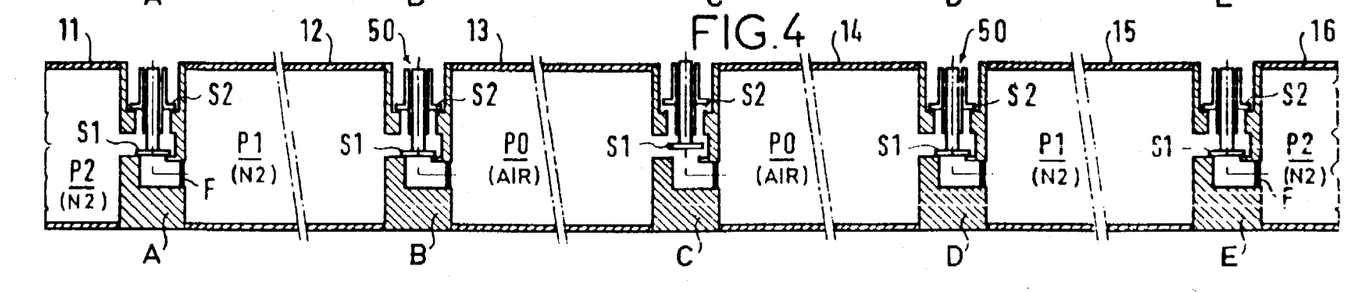

FIG. 4 shows the subsequent operation. The seats S1 in B and D are closed, so that the lengths AB and DE retain a nitrogen atmosphere at a pressure P1 equal to 1,000 hectopascals. The seat S1 of C is kept open and is connected to a vacuum pump in order to empty out the nitrogen contained in the lengths BC and CD prior to dismounting the lengths CD. At the end of this operation, the lengths BC and CD are filled with air at atmospheric pressure P0.

Figure 5:
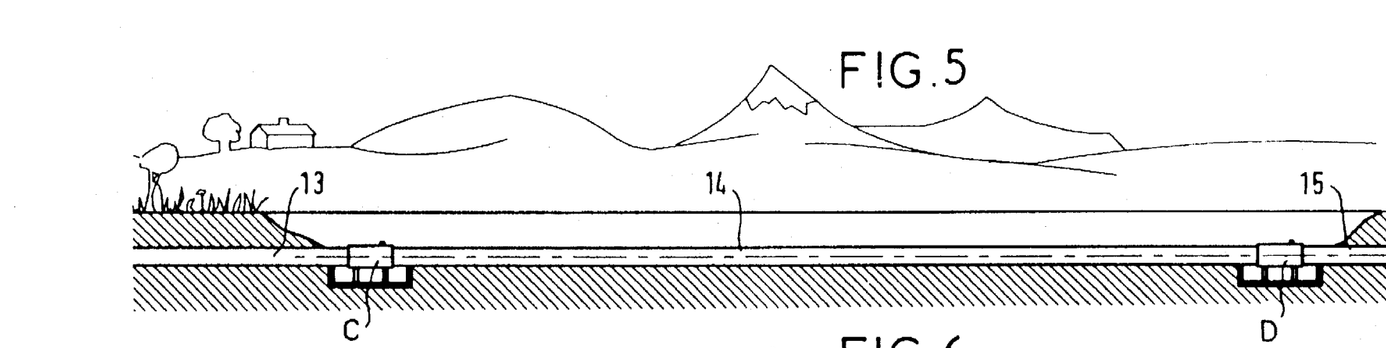
FIGS. 5 to 7 show the operations of removing a length that is to be replaced.
Figure 6:
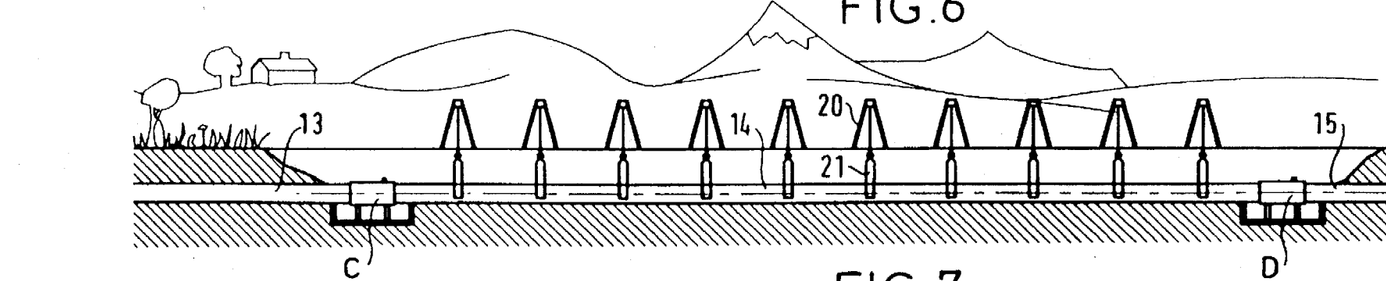
Figure 7:
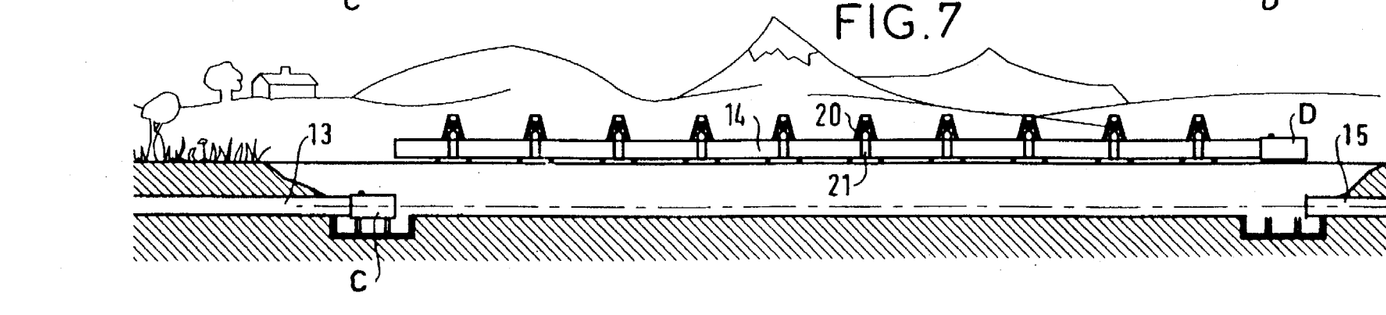

It is then possible to begin the operations of removing the lengths CD, as shown in FIGS. 5 to 7.

Firstly (FIG. 5), earth is removed from around the length CD and around the dismounting compartments C and D at either end thereof, using a trench that is 2 m to 3 m wide, for example.

Trestles 20 are placed along the length of cable, and they carry straps 21 which are passed beneath the cable (FIG. 6). By hoisting the straps (FIG. 7) it is possible to raise the length together with its associated compartment C.

It can then be replaced by a new length, by performing the same operations in reverse.

There follows a description of the joint and the associated valve.

Figure 8:
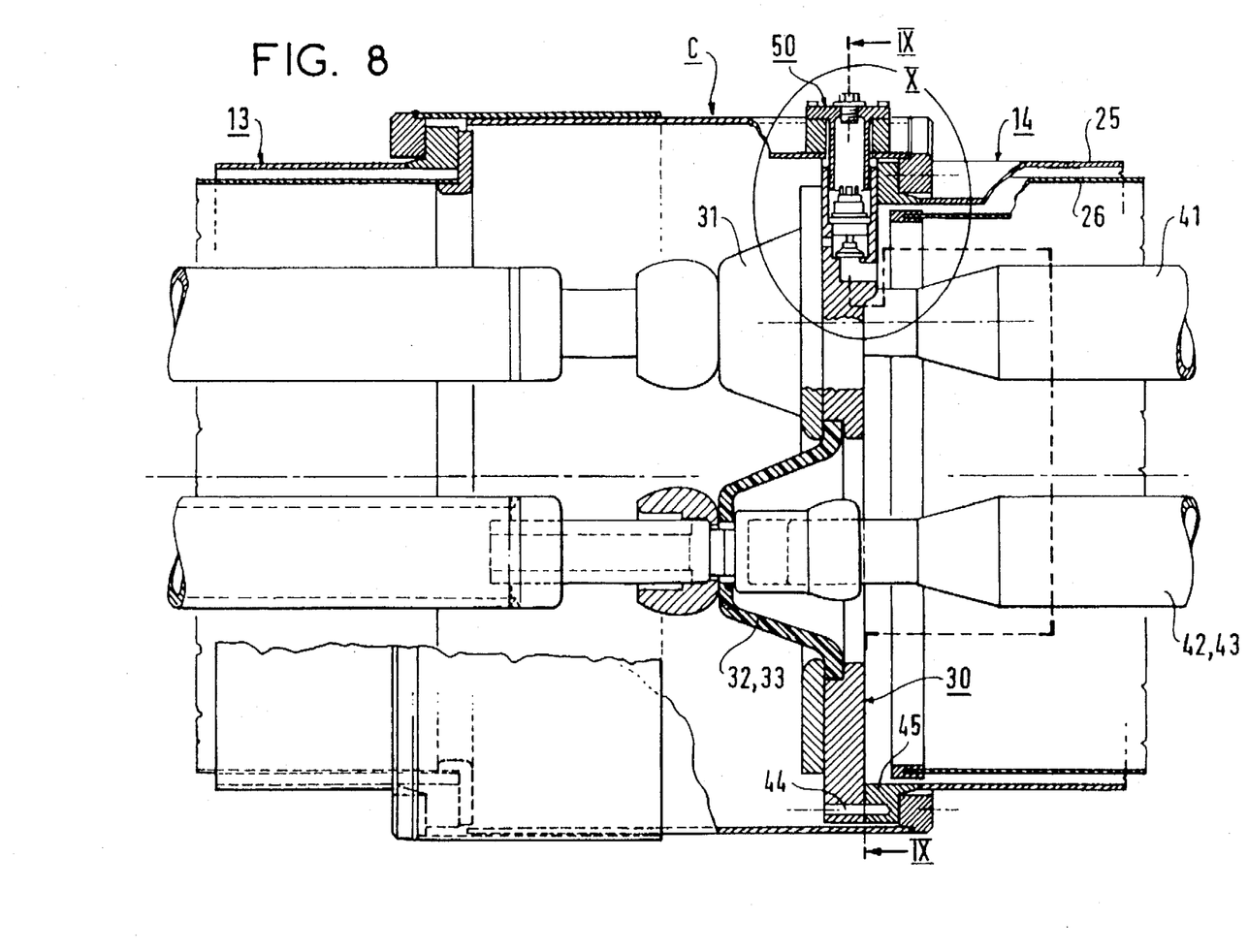
FIG. 8 is a longitudinal section through a portion of cable with its dismounting compartment showing the joint of the invention.
Figure 9:
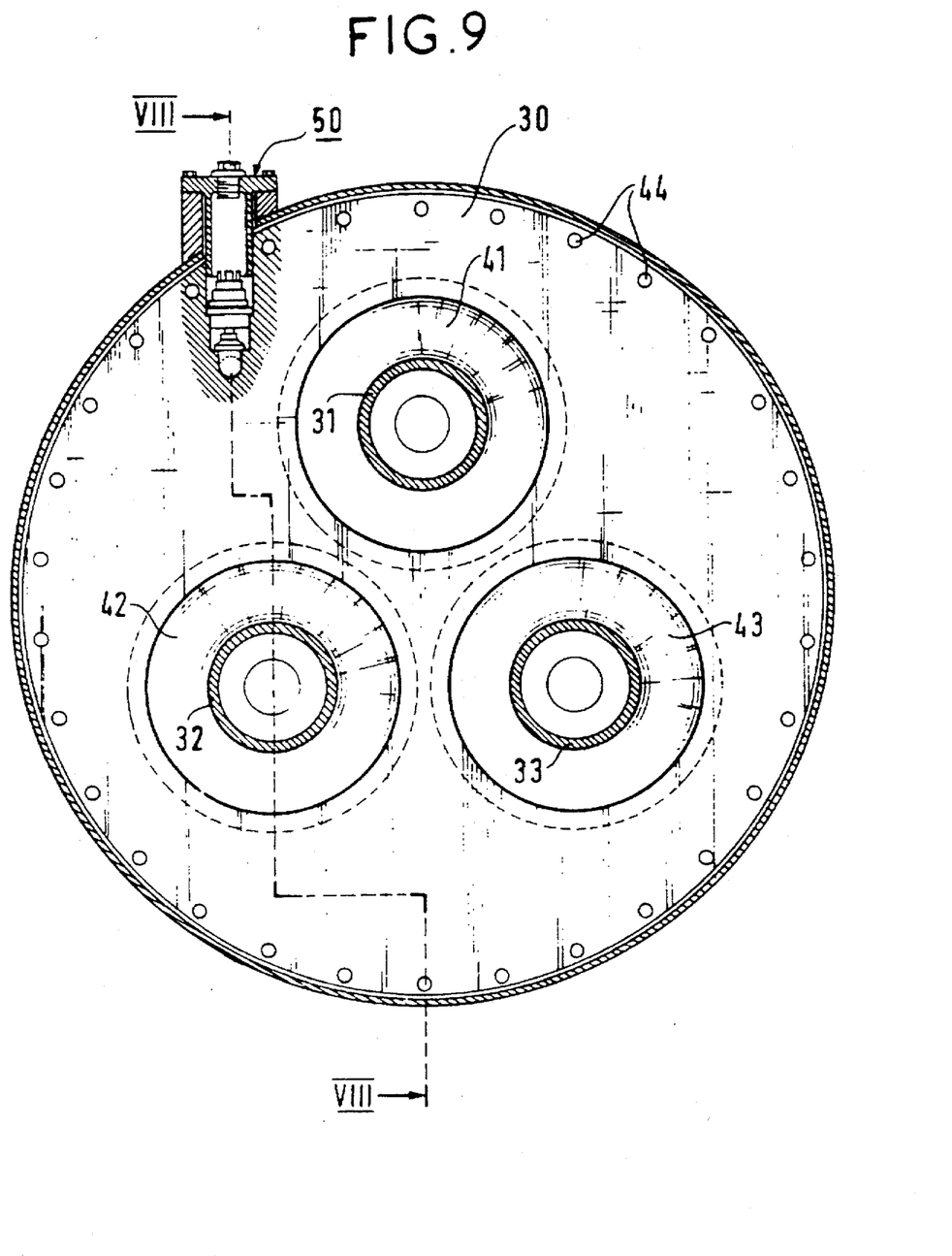
FIG. 9 is a section on line IX—IX of FIG. 8.

FIG. 8 is a longitudinal section through a portion of cable together with its dismounting compartment and the joint of the invention. There can be seen portions of lengths 13 and 14 that are connected to dismounting compartment C which forms a part of length 14. Reference is also made to FIG. 9 which is a section view on line IX—IX of FIG. 8. In FIG. 8, there can be seen the steel case 25 and the aluminum case 26. The dismounting compartment includes the joint of the invention given overall reference 30. It carries three sealed closed insulating cones 31 to 33, two of which, 31 and 32, can be seen in the figure. The cones serve as supports for the conductors 41 to 43. The joint has peripheral bores 44 to enable it to be fixed by screws to a ring 45 which is welded to the steel case 25. At a portion of its periphery, the joint 30 is of increased thickness, i.e. it has a boss, serving to receive components of a valve given overall reference 50, and as described below with reference to FIG. 10.

Figure 10:
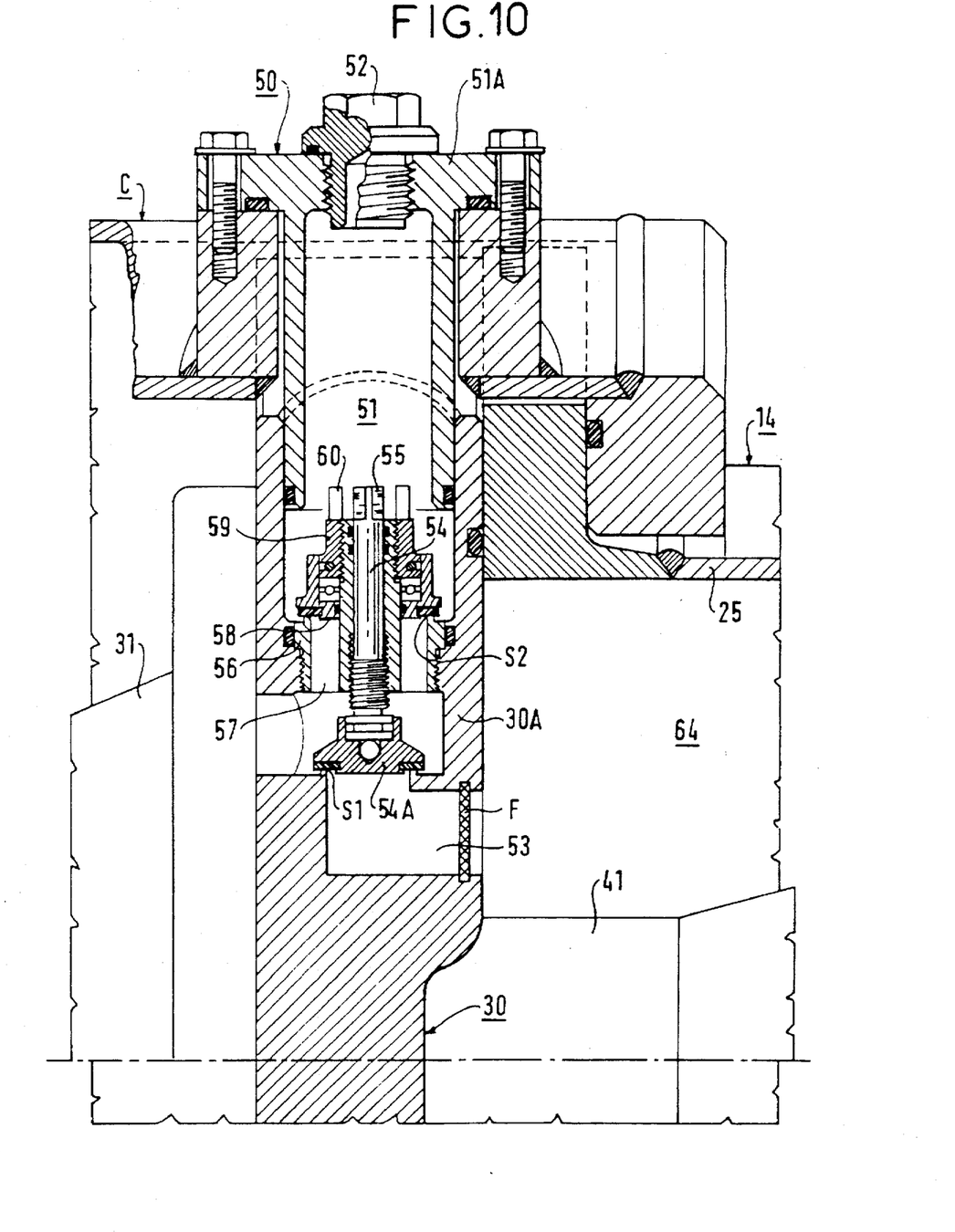
FIG. 10 is a detailed section view of the valve.

As can be seen in FIG. 10, the extra thickness or boss 30A of the joint 30 has a main bore 51 for housing the components of the valve 50. This bore is normally closed by a sealed cover 51A provided with a plug 52. To Gain access to the components of the valve, it is necessary to use a first wrench, as shown in FIG. 2, to unscrew the plug 52. The valve has a first passage 53 fitted with a filter F (on the projecting side of the boss), for filtering dust while allowing the two lengths 13 and 14 on either side of the joint to communicate with each other. This passage can be closed by a first valve member 54A pressing against the seat S1 which is constituted by a shoulder inside the boss. The first valve member is fixed to the end of a first rod 54 provided with an opposite end 55 suitable for engaging a second wrench disposed at the end of a pole.

The first rod 54 screws in a partially tapped axial bore in a cylindrical part 56, which is in turn screwed in sealed manner in the bore 51. Gaskets provide sealing between the rod 54 and the part 56. The part 56 has peripheral bores 57 whose orifices constitute the seat S2 and which are capable of being closed by a second valve member 58 provided with a second rod 59 whose end 60 can be driven by means of a third wrench on a pole. The second rod 59 is screwed on an outside thread on the part 56. Gaskets provide sealing between the parts 56 and 59. By opening the seat S2, the volume 64 of the compartment 13 can be put into communication with the atmosphere.

The respective ends 55 and 60 of the rods 54 and 59 may have Grooves or teeth at different pitches.

When the faulty length is replaced by a new length, it is necessary to evacuate the adjacent lengths 13 and 14 in order to remove moisture and atmospheric air therefrom prior to filling them with nitrogen.

Figure 11:
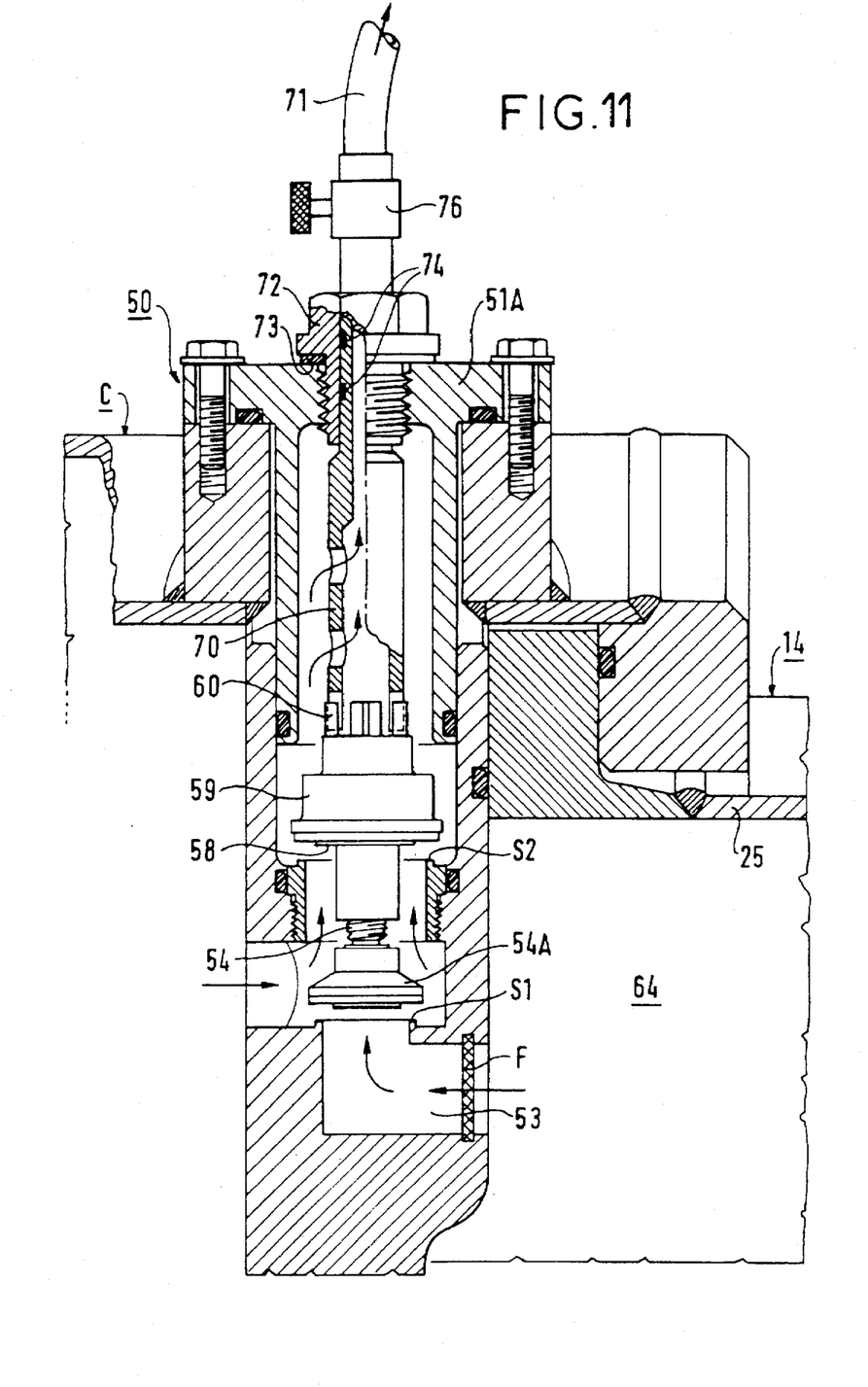
FIG. 11 shows a wrench for evacuating a length.

FIG. 11 shows a special fourth, tubular wrench 70 which is engaged in the bore 51 after the plug 52 has been removed.

This tubular wrench 70 is terminated at one end by teeth suitable for engaging the end 60 of the rod 59 of the valve member 58 on seat S2, and its other end is capable of receiving in sealed manner a hose 71 connected to a vacuum pump P.

The tubular wrench 70 is engaged in the bore 51. The plug 52 is replaced by a sleeve 72 having an outside thread and carrying a gasket 73. The sleeve is preferably made of a plastics material such as Teflon or Rilsan (registered trademarks). The tubular wrench 70 is provided with a valve 76 that is capable of being operated from outside. Gaskets 74 provide sealing between the tubular wrench and the sleeve.

To evacuate the compartment 14 (volume 64), the seat S1 is opened and the seat S2 is opened, after which the plug 52 is removed and replaced by the sleeve 72 together with its gasket 73. The tubular wrench 70 is inserted until it comes into contact with the end 60 with which it is then engaged. The valve is engaged opened and the vacuum pump is switched on.

When a vacuum is established, the valve 76 is closed, the hose 71 is disconnected, and the tubular wrench 70 is operated to close the seat S2.

The fourth, wrench tubular 70 can then be withdrawn.

Filling with nitrogen then takes place by opening the seat S1 using the second wrench, and then opening the seats S1 of the valve B and of the valve D, and finally by opening the seats S1 of the valve A and of the valve E.

The nitrogen at a pressure of 12,000 hectopascals in the other lengths upstream and downstream then penetrates into the lengths AB, BC, CD, and DE through the filters F.

The final pressure is adjusted by opening the feed valves placed at the departure and arrival ends of the cable.

When nitrogen filling has been completed, the second wrench is removed and the plug 52 replaced.

The invention is simple and cheap in structure, and highly reliable in operation.

We claim:

1. A joint for assembling together two adjacent lengths of a long-distance gas-insulated three-phase cable via an assembly compartment, said joint including a boss containing first and second seats of an externally-controllable valve means, said valve means including first and second valve members and means for effecting selective drive combinations for establishing communication independently between inside volumes of said adjacent lengths, an outside of the cable with the inside volumes of both of said adjacent lengths, or the outside of the cable with an inside volume of only one of said lengths via said first and second valve members and said first and second seats.

2. A joint according to claim 1, wherein said boss has a main bore opening to the outside of the cable and provided with a sealed cover fitted with a removable plug capable of being withdrawn or replaced by means of a first wrench.

3. A joint according to claim 2, wherein the joint includes a passage through said boss for putting the inside volumes of the two adjacent lengths into communication, said passage being closable by means of said first valve member bearing against said first seat constituted by a shoulder inside the boss, said first valve member being fixed to a first rod opening out into said main bore facing and open to the cover and provided with engagement means for engaging a second wrench operable from the outside of the cable upon removal of said plug.

4. A joint according to claim 3, wherein said first rod is moved axially by screwing the first rod inside an axial bore in a cylindrical part disposed axially in a stationary manner inside the main bore.

5. A joint according to claim 4, wherein said cylindrical part is pierced by a plurality of axial bores opening out firstly into said passage and secondly into the main bore facing the cover, the ends of said axial bores facing the cover constituting said second valve seat closable by said second valve member which is fixed to a second rod terminating in said main bore at a cover end and being provided with engagement means for engaging a third wrench operable from the outside of the cable through said cover.

6. A joint according to clam 5, wherein the second rod is a coaxial tube that screws on said cylindrical part.

7. A joint for assembling together two adjacent lengths of a long-distance gas-insulated three-phase cable via an assembly compartment, said joint including a boss containing first and second seats of an externally-controllable valve means, said valve means including first and second valve members and means for effecting selective drive combinations for establishing communication independently between inside volumes of said adjacent lengths, an outside of the cable with the inside volumes of both of said adjacent lengths, or the outside of the cable with an inside volume of only one of said lengths via said first and second valve members and said first and second seats, said boss having a main bore opening to the outside of the cable and provided with a sealed cover fitted with a removable plug capable of being withdrawn or replaced by means of a first wrench, a passage through said boss for putting the inside volumes of the two adjacent lengths into communication, said passage being closable by means of said first valve member bearing against said first seat constituted by a shoulder inside the boss, said first valve member being fixed to a first rod opening out into said main bore facing and open to the cover and provided with engagement means for engaging a second wrench operable from the outside of the cable upon removal of said plug, said first rod being moved axially by screwing the first rod inside an axial bore in a cylindrical part dispose axially in a stationary manner inside the main bore, said cylindrical part being pierced by a plurality of axial bores opening out firstly into said passage and secondly into the main bore facing the cover, the ends of said axial bores facing the cover constituting said second valve seat closable by said second valve member fixed to a second rod terminating in said main bore at a cover end provided with engagement means for engaging a third wrench operable from the outside of the cable through said cover, and wherein the plug can be replaced by a tubular wrench provided at one end with means engageable with the end of said second rod and at its other end with means for connection to a vacuum pump, said tubular wrench being provided with plug-replacement means for being fixed in a sealed manner in the place of the plug within said cover, and a valve placed between the means for connection to the vacuum pump and the plug-replacement means.

8. A joint according to claim 3, wherein the passage includes a dust filter on one side of said boss.

* * * * *